United States Patent

Mecklenborg

[11] 4,065,859
[45] Jan. 3, 1978

[54] VISUAL DISPLAY APPARATUS

[75] Inventor: Richard A. Mecklenborg, Binghamton, N.Y.

[73] Assignee: The Singer Company, Binghamton, N.Y.

[21] Appl. No.: 397,147

[22] Filed: Sept. 13, 1973

[51] Int. Cl.² .................... G09B 9/08; B64G 7/00
[52] U.S. Cl. .................... 35/12 N; 350/96 R
[58] Field of Search .......... 35/11, 12 N, 10.2; 40/28 C, 52 R, 130 D, 130 E, 130 K, 130 L, 106.52; 240/1 R, 1 EL, 1 LP, 1.2, 10 L; 340/380, 324 R, 336, 26; 350/96 R, 96 B

[56] References Cited

U.S. PATENT DOCUMENTS

| 3,253,274 | 5/1966 | Berman | 340/380 X |
|---|---|---|---|
| 3,439,157 | 4/1969 | Myles | 240/1 EL |
| 3,549,238 | 12/1970 | Graser, Jr. | 350/96 B X |
| 3,623,240 | 11/1971 | Wood | 35/12 N |
| 3,671,100 | 6/1972 | Bushman et al. | 35/12 N |
| 3,715,822 | 2/1973 | Hansen, Jr. et al. | 40/130 K |
| 3,761,156 | 9/1973 | Mohon et al. | 35/12 N |

*Primary Examiner*—William H. Grieb
*Assistant Examiner*—Vance Y. Hum
*Attorney, Agent, or Firm*—Jeff Rothenberg; James C. Kesterson

[57] ABSTRACT

Light transmission of ends of optical fibers simulating runway lights in a scale-model system is markedly increased by grinding and polishing each such fiber end at an angle which provides total internal reflection of most light in each fiber and consequent light projection in a desired direction at a small angle to a simulated airfield runway surface.

19 Claims, 9 Drawing Figures

VISUAL DISPLAY APPARATUS

This invention relates to aircraft simulator visual systems, and more particularly, to an improved runway lighting system for camera-model visual display systems used in such simulators. To obtain a desired realism, many modern aircraft simulators, particularly those for large commercial aircraft, use visual display systems. One widely-used type of visual display system comprises a television camera which is moved relative to a runway and terrain scale-model as the trainee pilot "flies" the simulated aircraft. The scale models used in such systems incorporate much detail in order to realistically simulate airport conditions. For maximum training capability such models must be useful not only for simulated daylight landing operations, but also simulated night-time operations, and to realistically simulate the latter operations, various lights used at airfields must be simulated, such as runway lights, strobe lights, and sometimes so-called VASI lights, which provide a pilot with a visual indication of whether he is above, below, or on the proper glide slope. Various other lights of different colors and intensities must also be provided.

Various types of simulated lighting systems heretofore have been used with runway and terrain models. In one prior system a plurality of optical fibers are used, with each fiber tilted approximately 25° relative to the horizontal upper surface of the simulated runway, and each connected to a sub-assembly which is inserted in the simulated runway model member. In another prior system plastic inserts which extend above the model surface and have lens-shaped ends are used, as shown in U.S. Pat. No. 3,623,240. In each of these prior systems the input ends of the optical fibers or plastic inserts are flooded with light, which is thereby transmitted to the upper surface of the runway model.

A major deficiency of such prior systems using optical fibers has been a lack of adequate brightness in the display observed by the television camera, largely because of the large upward angle (e.g. 25°) at which the fibers have projected their light. Since normal aircraft approaches are made at relatively small angles, of the order of 7° or less, actual approach lights are arranged to project most of their light at similar small angles. It is apparent that the light from the fibers could be used much more efficiently if the fibers extended through the model runway surface at a very small angle of the order of 5°. However, it is extremely difficult and practically impossible, to drill holes through a metal plate at such small angles. Where small plastic inserts have been used in an attempt to more efficiently direct the light from optical fibers, difficulties have been experienced in coupling light from the fibers to the inserts, and in accurately locating the inserts in the model runway surface. In addition, the plastic inserts have been difficult to fabricate because of their necessarily small dimensions. Such prior systems have also suffered a loss of brightness due to light loss at condenser-fiber interfaces. The prior art scale model lighting systems also have been disadvantageous in that the color of the simulated lights has undesirably changed when the brightness of the lights has been changed, which typically has been done by varying the voltage applied to an incandescent lamp. Airfields commonly use both white and yellow lights, so that the yellowish color which occurs during reduced-voltage operation can cause trainee confusion between white and yellow lights on the scale model.

Thus it can be seen that a need exists for an improved runway lighting system for use with camera-model visual display systems which has adequate brightness, which maintains an even color as brightness is decreased, which can simulate different colors and types of lights, such as strobe lights and VASI lights, and in which individual simulated lights may be easily installed, maintained and replaced, if required. It is a primary object of the present invention to provide a terrain-runway model having such improvements, which may be used singly or in combination, and which avoids the abovementioned deficiencies of the mentioned prior art arrangements.

Other objects of the invention will in part be obvious and will in part appear hereinafter.

SUMMARY OF THE INVENTION

The present invention, like some of the prior systems noted above, uses fiber optics, but light transmission in the desired direction along the simulated glideslope is increased to approximately 80% rather than the 5% transmission typically obtained in the prior art. The improved light transmission is also accomplished by the invention without the need for special plastic inserts and without a requirement that the fibers extend through the runway surface at an extremely small angle. In fact, as will be seen below, each fiber may extend perpendicularly through the runway plate, which greatly simplifies the drilling of the runway plate and considerably facilitates spacing the fibers close to each other. In accordance with a central concept of the present invention, improved transmission in the desired direction along the simulated glideslope at a very small angle to the runway surface is accomplished by optically grinding and polishing the ends of the fibers. A flat surface is formed at an angle on the projecting end of each fiber so as to produce total internal reflection of most of the light within the fiber, so that most of the light is projected approximately perpendicularly to the axis of each fiber, but at the slight upward glideslope angle, thereby providing maximum brightness along the simulated glideslope where it is required. Unique light source means couples light from a source uniformly into the ends of each of the fibers. The input cone of light for all of the fibers is the same thereby resulting in a uniform light output. To avoid a color change as light intensity is varied, a special optical system is used which forms an image of a lamp at an iris diaphragm, and as the iris diaphragm is closed, the light is reduced but its color remains constant. Filters may be installed in a filter plane so that various colors may be simulated. Also shown are methods for simulating VASI lights and strobe lights.

DETAILED DESCRIPTION OF THE PREFERRED EMBODIMENT

Figure 1:
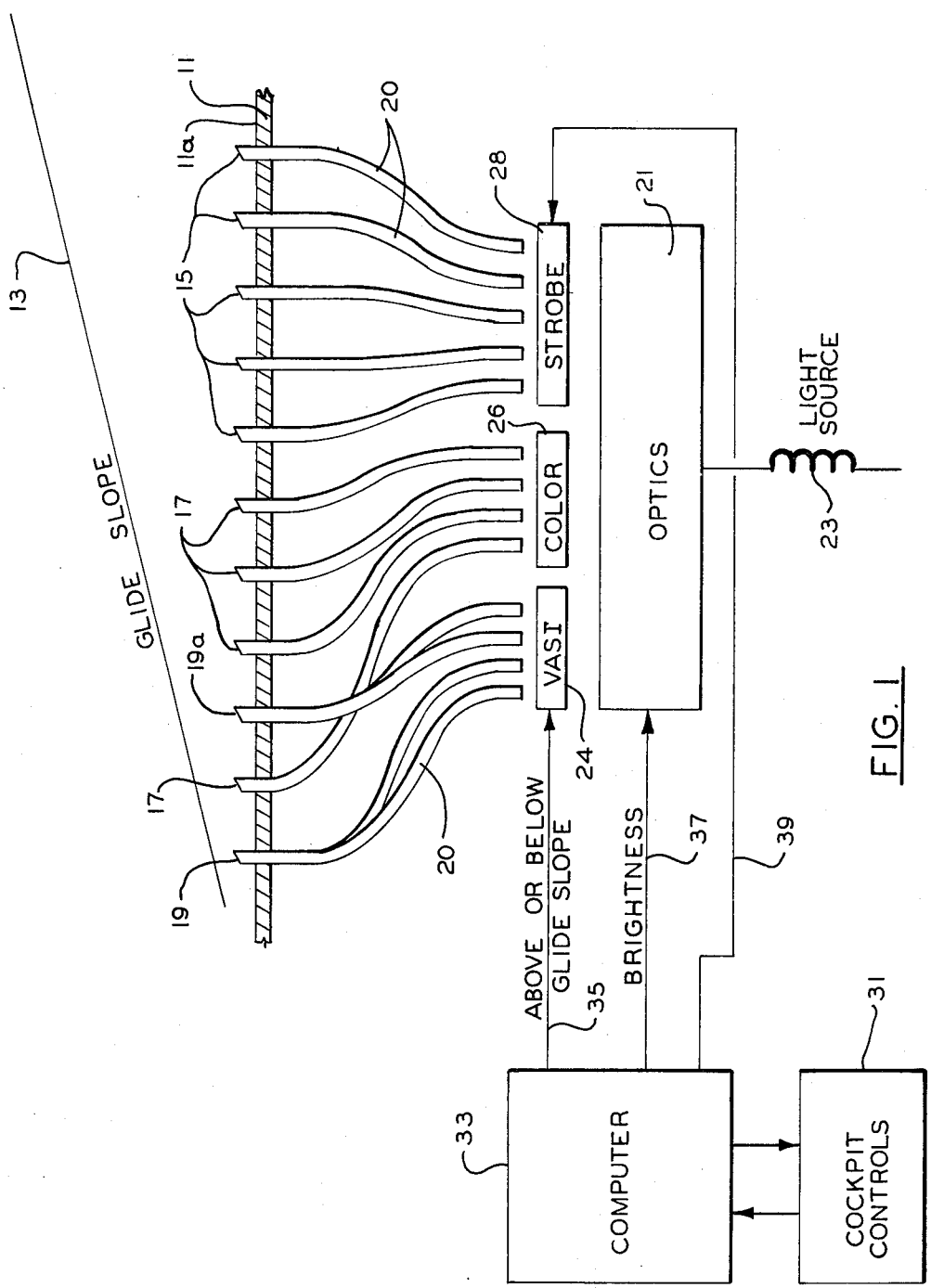
FIG. 1 is a block diagram of the lighting system of the present invention showing a portion of a simulated runway model in cross-section.

FIG. 1 illustrates generally the types of lights which are frequently found on a typical airfield runway, or in this case, on a reduced-scale model of a runway. It should be noted that the positioning of the lamps on the figure is not meant to depict the actual arrangement of lights on a runway to a proper scale, but rather merely to show different types of lights which commonly are present. A rigid model member 11 comprises a plate supported in conventional fashion by means not shown. In a typical application plate 11 might comprise an aluminum plate ⅜ inch thick, perhaps 50 feet long and 15 feet wide. The portion of plate 11 shown in FIG. 1 represents only a small runway portion of the base member of the model, and it is to be understood that a typical terrain-runway model will include not only portions of one or several airfield runways but also surrounding terrain and various objects such as miniature airport hangars and the like. As a simulated flight progresses, a television camera (not shown) which views the terrain and runway model is computer-controlled to be moved relative to the model in reduced-scale correspondence to the motion of the simulated aircraft. As a simulated approach and landing occurs, the camera viewpoint will approach the runway generally along glide slope 13 (exactly along line 13 if an ideal landing is made.) Spaced along an approach end of the simulated runway are a plurality of optical fibers, 15, 15 each of which provides a simulated airfield strobe light. Such lights individually flash on and off in succession which provides an appearance of a ball of light which rapidly traverses a path in the direction of the runway. A further plurality of optical fibers 17, 17 represent runway lights located along the sides of the runway. Such lights ordinarily are a white color, although other colors may be used to indicate taxi ways and the like. At the far end of the simulated runway optical fibers 19 and 19a are provided to simulate VASI lights. The display presented by a VASI light system and observed by a pilot varies between two colors, e.g., red and white, with the amount of each color observed indicating whether the pilot is above, on, or below the proper glide slope. For example, the light observed from fiber 19 should be white if the simulated aircraft is above the upper boundary of the glide slope corridor, and red if it is instead below. Similarly, the light provided by fiber 19a should be white if the simulated aircraft is above the lower boundary, and red if it is instead below. Thus, when the aircraft is within the glide slope corridor, light 19 should be red and 19a white, if it is below the lower boundary both should be red, and if it is above the upper boundary both lights should be white. When the aircraft is exactly on the top edge of the glide slope, near VASI light 19a will be white and far VASI light 19 will be pink.

Each of the simulated lights 15, 17, and 19 comprises the end of a single optical fiber which projects upwardly through the model 11 slightly above its upper surface 11a. All of the fibers are grouped in a bundle and routed to the vicinity of an optical system 21 to be described below. Optical system 21 receives input light from a light source 23 and transmits light into the ends of the optical fibers 20. Interposed between the optical system 21 and the ends of the fibers 20 is a VASI control shown as a block 24 which controls the output of light to the VASI fibers 19 and 19a, a color filter shown as a block 26 which establishes the color of the lights 17, 17, and a strobe control shown as block 28 which causes a sequential strobing or flashing of lights 15, 15. The flight simulator system with which the visual system is used includes a conventional simulated cockpit and controls 31, which provide electrical input signals to a computer 33. Computer 33 provides output signals to indicators (not shown) in the cockpit in well-known fashion. The computer provides an output signal on line 35 to the VASI light control 24, and the signal may be the same type of signal which is conventionally provided to position the horizontal needle of the simulated ILS indicator instrument in the cockpit. Similarly, an output on line 37 from computer 33 may be provided to optical system 21 to control the brightness of the lights as a function of the simulated distance of the aircraft from the simulated runway. A further computer output signal on line 39 may be provided to activate the simulated strobe lights. A Sigma 5 computer, manufactured by the Xerox Corporation, has been successfully employed to generate the described output signals. Alternatively, of course, any other analog or digital computer capable of performing the same function may be used.

Figure 2:
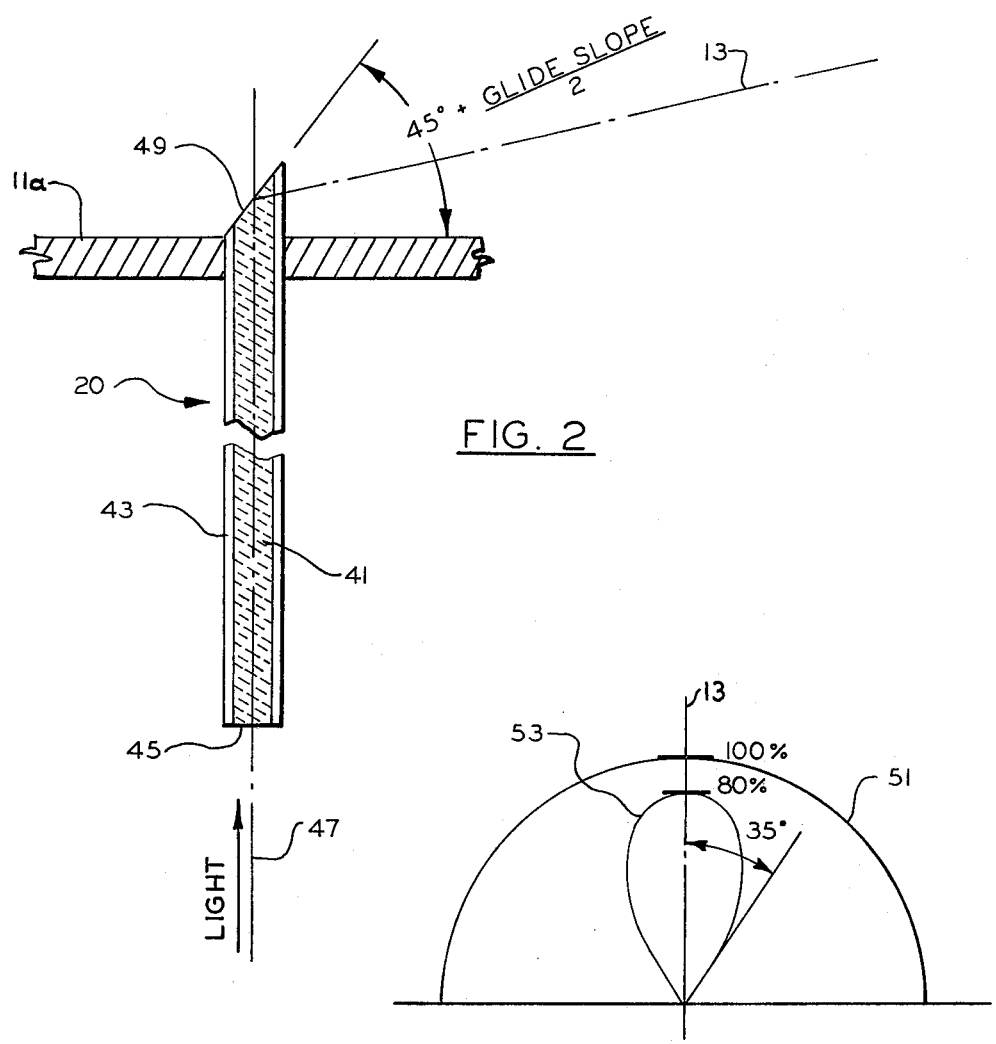
FIG. 2 is a cross-sectional view of a single optical fiber illustrating the manner in which the ends of the fibers are polished and shaped to obtain the desired increased light transmission.
Figure 3:
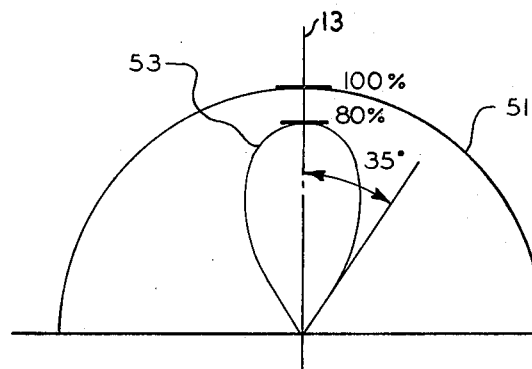
FIG. 3 is a graph illustrating the manner in which input and output brightness vary as a function of the angle. The angle is referenced to the output axis of the fiber or the glide slope with which it is aligned.

FIG. 2 illustrates the construction of each of the optical fibers 20 of FIG. 1. Each fiber comprises a flexible, generally cylindrical glass fiber enclosed in or surrounded by cladding 43 in well-known fashion, which cladding may comprise a glass of lower index of refraction than the fiber core. The input end 45 of each fiber comprises a flat, polished light receiving surface perpendicular to the longitudinal axis 47 of the fiber at the input end. In a typical application wherein the scale reduction to the model is approximately 1 to 2,000, each optical fiber may have a diameter of approximately 0.015 inch. In FIG. 2 the optical axis of the upper end of fiber 20 is shown extending perpendicularly to the upper surface 11a of the model base member or runway plate. The projecting end of fiber 20 extending above surface 11a is shown as including a polished flat face 49 which is ground at an angle relative to the axis of the end of the fiber equal to 45° less one-half the simulated glideslope angle, or relative to the simulated runway surface at 45° plus one-half the glide slope angle. In a typical application the glide slope angle (i.e., the angle between the center of the glide slope and the runway surface) will be on the order of 4°, and hence the end of each fiber will be ground at an angle of 47°. Provision of such a surface on the projecting end of the fiber causes a major portion of the light applied to the fiber to be projected along the simulated glide path 13, and it has been found that light transmission along the glide path may be increased from the 5% obtained with prior systems to approximately 80%. By optically grinding and polishing the ends of the fibers as described above, the transmission of optical fibers 20 is not only increased, but the optical polishing eliminates scattering and thereby greatly reduces surface light loss. Provision of the flat surface 49 at the mentioned angle on the projecting end produces total internal reflection for most of the light passing through the fiber, so that most of the light exits along the simulated glide slope. Since the axis of the fiber is reflected along the guide slope, the maximum brightness in the cone of light projected by each fiber also will occur along the glide slope. If surface 49 is not perfectly polished, a small amount of light will be projected upwardly, normal to the surface of plate 11. FIG. 3 illustrates typical input and output brightness relationships of the optical fibers as a function of angle, curve 51 indicating input light and curve 53 indicating relative output brightness, with the vertical axis in FIG. 3 representing the direction of glide slope 13.

In FIG. 2, if surface 49 were to lie exactly at a 45° angle to runway surface 11a, maximum light transmission would occur parallel to surface 11a. Thus it will be apparent that maximum light could be directed along the simulated glideslope 13 with surface 49 arranged at 45° to the fiber axis if the fiber were tilted counterclockwise in FIG. 2 by the angle of the simulated glide slope. While such an arrangement is within the scope of the invention, it is much preferred that the fibers extend perpendicularly through the runway plate, since that considerably simplifies the drilling of the many separate holes through the runway plate required in a typical scale-model airfield.

Figure 4:
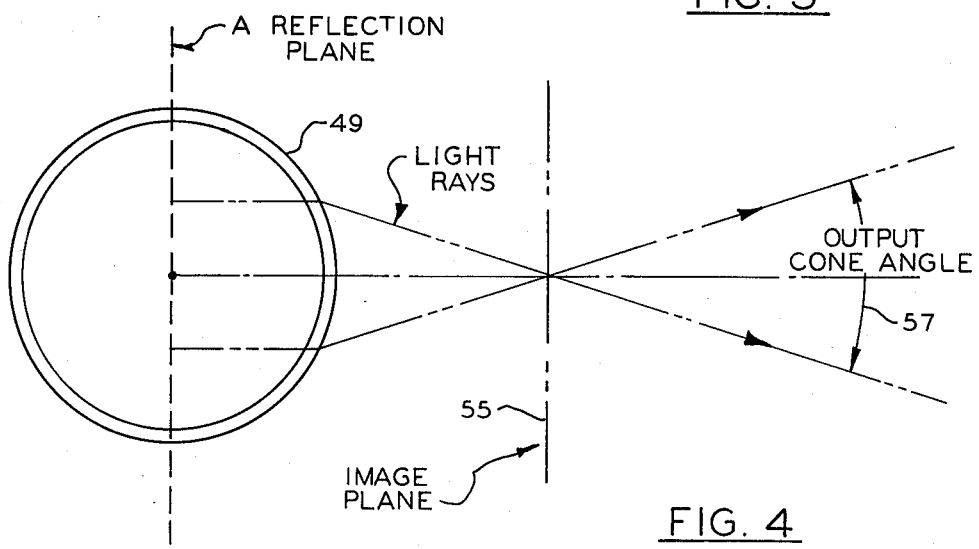
FIGS. 4 and 5 are optical diagrams illustrating the manner in which the cylindrical shape of each simulated runway light fiber forms an image at its output end.
Figure 5:
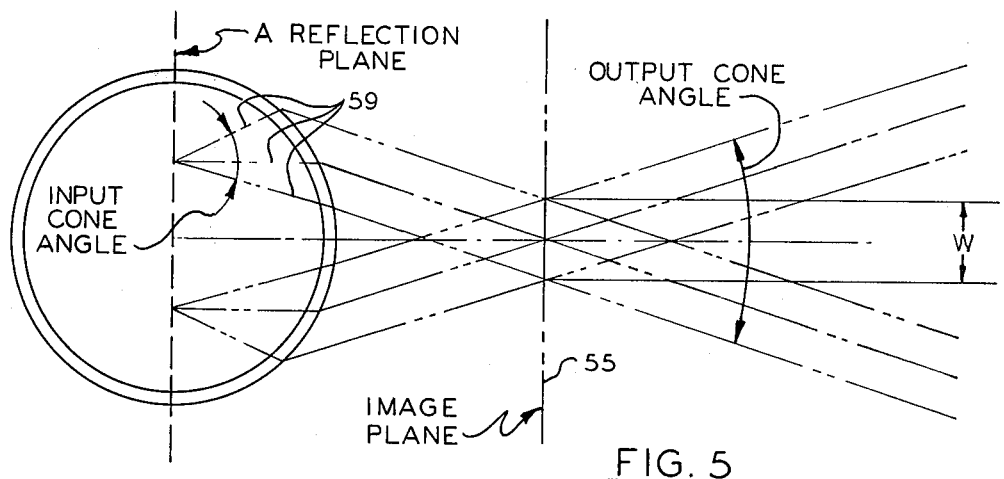

As well as directing the major portion of the projected light at the desired vertical angle, i.e., along the simulated glide slope, provision of the polished flat surface on the end of a fiber, together with the cylindrical cross-section of the fiber, advantageously causes the fiber end to act as a lens to shape the horizontal spread of the beam of light projected from the fiber. This is illustrated in FIGS. 4 and 5, plan views looking down on the end of the fiber of FIG. 2 in the direction of line 47. FIG. 4 illustrates a bundle of rays in the fiber which is reflected by the polished surface. As indicated in FIG. 4 the rays form an image at plane 55, and an output cone of light having a width defined by angle 57 results. By including other rays from a collimated source, as illustrated in FIG. 5, an image width W can be obtained. In FIG. 5 the plurality of rays 59 emanating from each point result in the image of width W at image plane 55, and rays not imaged on the axis are diminished in intensity due to the absorption illustrated by the curves of FIG. 3. The horizontal dispersion of the light is brightest over approximately a 30° angle. The vertical angle of dispersion is approximately 7°, centered on the glide slope line 13. The light from the fiber can be seen from other positions, but at greatly diminished intensity. As viewed from the opposite end of the runway, intensity will be at its minimum. In practice, the maximum image width is about ⅔ of the fiber width, and the minimum image width is approximately ⅓ the fiber width. The height of the image will be approximately the diameter of the fiber. However, a reduction in this height can be obtained by lowering the fiber into the runway so that less of the end 49 is exposed.

Figure 6:
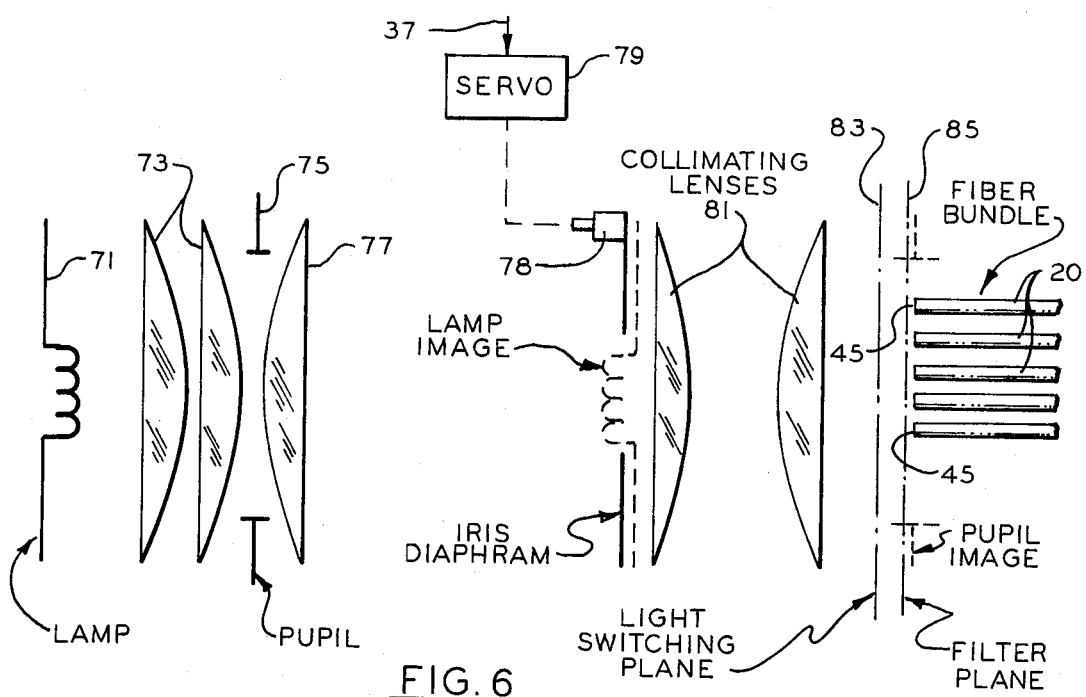
FIG. 6 is an optical diagram illustrating the illumination system or light source means of the present invention.

The optical system 21 illustrated in FIG. 6 is designed so that the input cone of light for all fibers in the bundle is the same (i.e., the input cones of light have parallel axes and equal angles), thereby resulting in uniform light output from the different fibers. Uniform light output is achieved by relaying the pupil of a condenser lens assembly to the input ends of the optical fibers 20. The illumination source comprises a lamp 71, the light output of which is applied through condenser-relay 73 77 having a condenser pupil 75, a fixed physical aperture. Condenser-relay 73 images the filament of lamp 71 at an iris diaphragm 78. Iris diaphragm 78 is controlled by a conventional position servo 79 which receives the simulated range signal on line 37 mentioned above. Thus, as the simulated aircraft approaches the runway and the camera of the camera-model system becomes closer to the lights, the simulated light intensity may be decreased by driving the iris further closed. Because the lamp voltage and filament temperature need not be changed, only the intensity and not the color of the light will be affected. The image is then collimated by collimating means shown as comprising lenses 81, and passed through a light switching plane 83, and a filter plane 85 to be described in detail below, to the ends 45 of the optical fibers. Lenses 81 also act to image the condenser pupil 75 at the input to the ends 45 of fibers 20. In addition, as the diaphragm closes, the input cone of light is reduced, reducing the size of the image as will be evident from an examination of FIG. 6. As the input cone angle is reduced, the width W is also reduced. This is desirable, since as the simulated aircraft approaches the runway, it is desirable to provide a light of diminishing size, since the size of runway lights appears to decrease as they are viewed from successively smaller distances.

Figure 7:
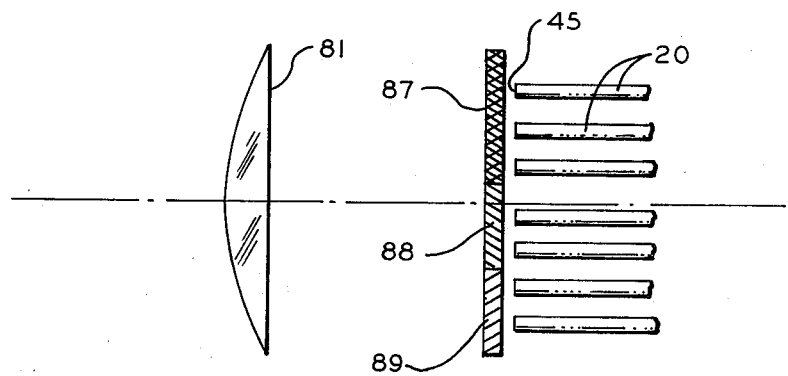
FIG. 7 is a cross-sectional view illustrating lights having various different colors which may be simulated with the present invention.

FIG. 7 illustrates the use of plural, differently-colored filters in the filter plane of FIG. 6. Different portions of the beam of light from lenses 81 are passed through a red filter 87, a blue filter 88, or a white filter 89 prior to entering the ends 45 of the optical fibers. By grouping all of the fibers 20 which are to provide a simulated light of a particular color behind a filter of that color, one may easily provide simulated lights with the different colors needed for a realistic runway model.

Figure 8:
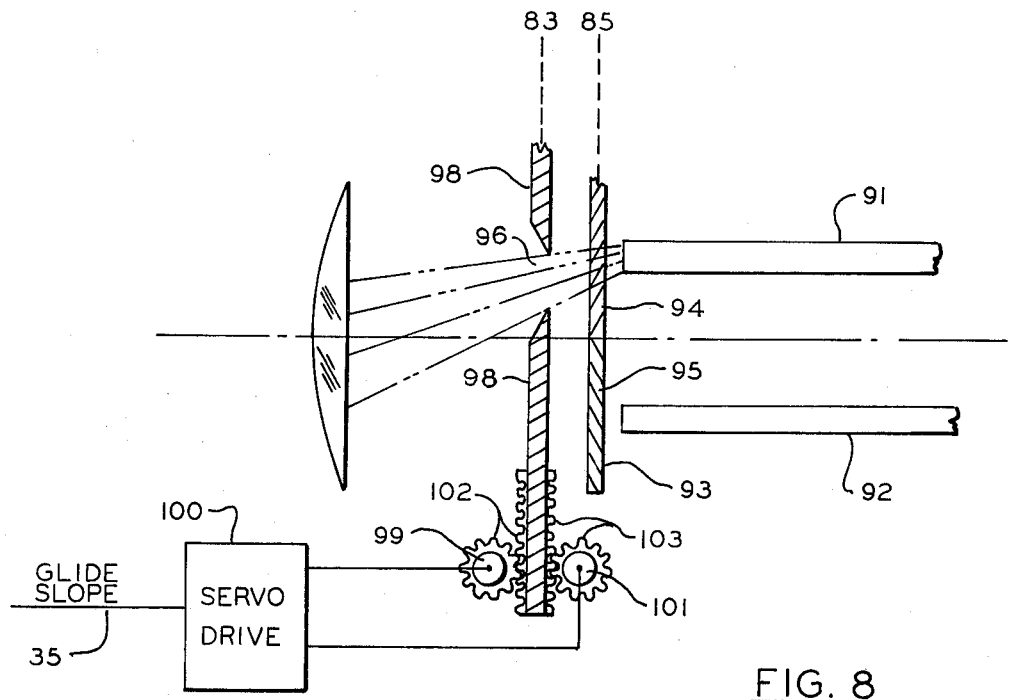
FIG. 8 is a cross-sectional view showing one manner of simulating VASI lights with the present invention.

FIG. 8 illustrates one manner in which simulation of VASI lights may be implemented. Two fibers 91 and 92 placed side by side form one projecting end such as end 19 of FIG. 1. The two fibers 91 and 92 extend to a split filter 93 located in filter plane 85. Split filter 93 has an upper portion 94 of a red color, and a neutral or white lower section 95. An aperture 96 provided in plate 98 at switching plane 83 is mounted to be driven vertically by servo motor 99 of a conventional position servo system, which also includes position feedback potentiometer 101, and amplifier circuit 100. An input signal supplied on line 35 from computer 33 thus causes aperture plate 98 to be raised or lowered relative to the split filter 93, thereby proportioning the relative amounts of light passing through aperture 96 which pass through the red section or the white section. With the aperture position shown in FIG. 8, all the light from aperture 96 passes through the red filter section, and thus the output of the simulated VASI light will be red. As the aperture plate 98 is moved downwardly, a mixture of red and white will result, giving a pink color, and if moved further downwardly, an all-white simulated light eventually will result. Thus while actual VASI light systems project beams of selected colors in fixed directions, the system of FIG. 8 instead varies the colors of portions of a projected beam as the simulated aircraft position changes, to provide a display to the trainee (via the closed-circuit television system) which realistically simulates the appearance of an actual VASI light system.

Figure 9:
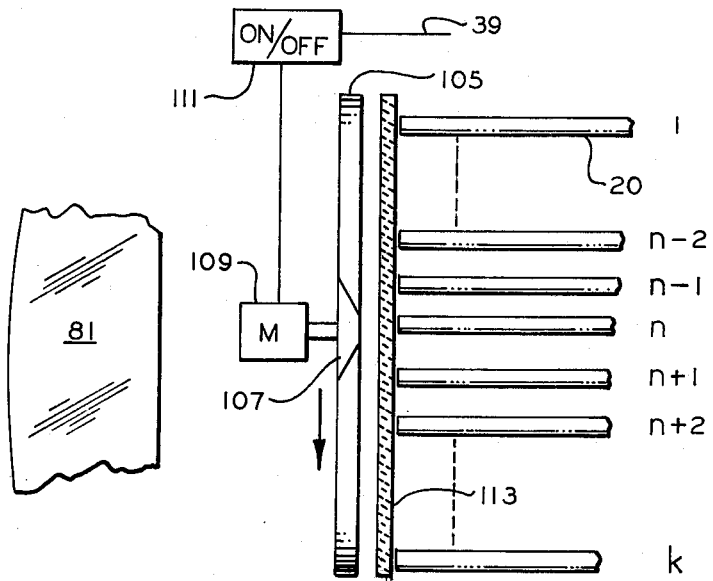
FIG. 9 is a cross-sectional view illustrating one manner in which strobe lights may be simulated with the present invention.

FIG. 9 illustrates one manner in which strobe lights may be simulated with the present invention. A rotatable aperture plate 105 containing at least one aperture 107 radially displaced from the axis of rotation is driven by motor 109, which is controlled to run or stop by switching control means 111 responsive to the input signal on line 39. The optical fibers 20 associated with the strobe lights 15 of FIG. 1 are spaced in a circular or arcuate arrangement behind the rotating aperture plate 105 to be illuminated in sequence as the aperture 107 passes them. Such a rotating aperture is described in detail in U.S. Pat. No. 3,623,240. Provided behind rotating plate 105 is a clear plate 113 against which fibers 20 are abutted, to provide uniform close spacing of the fiber ends from the rotating plate but prevent the fibers from accidentally touching the rotating plate.

As shown above, the end surface 49 of each projecting fiber is ground and polished at an angle which results in maximum illumination along the simulated glide slope; and as shown by FIGS. 3–5, the projected illumination varies distinctly with the angle of the surface, so it becomes extremely important that the projecting end of the fiber be accurately positioned. Novel method and apparatus for accurately but removably affixing such optical fiber to the runway plate so that it will extend the desired distance above the plate with its polished surface properly angularly oriented, are shown in an application Ser. No. 397,148 of Martin Dotsko filed on even date herewith, now U.S. Pat. No. 3,903,615, and assigned to the same assignee as the present invention.

Thus an improved simulated runway lighting system for camera-model visual display systems such as those used with aircraft simulators, which system provides greatly increased brightness, uniformity of brightness and ease of maintenance and replacement, along with providing each of the various types of light sources found on airfields has been shown. Although a specific embodiment has been illustrated and described, it will be obvious to those skilled in the art that various modifications may be made without departing from the spirit of the invention which is intended to be limited solely by the appended claims.

What is claimed is:

1. A runway model for use in a flight simulator visual display system, comprising, in combination:
   a generally flat base member having a simulated aircraft runway depicted on a first surface thereof, said runway extending in a first direction along said surface from an approach end;
   a first optical fiber having a longitudinal axis, an input end and an output end, said output end comprising a polished flat surface ground relative to the axis of said fiber at said output end at an angle approximating 45° less one-half of a simulated glide slope angle, said output end of said fiber extending through said flat member with at least a portion of said flat surface at said output end extending beyond said first surface of said member, with said axis of said fiber at said output end being generally perpendicular to said first surface and with said flat surface at said output end facing away from the approach end of said simulated runway; and
   light source means for supplying light to said input end of said fiber for transmittance by said fiber to its output end, whereby said flat surface at said output end reflects said fiber transmitted light toward said approach end of said runway at said simulated glide slope angle.

2. A model according to claim 1 wherein said light source means includes means for collimating the light being supplied to said input end of said optical fiber and an iris diaphragm for controlling the amount of light being supplied.

3. A model according to claim 1 further including a second optical fiber having a longitudinal axis, an input end and an output end, said input and output ends of said second fiber being placed adjacent the input and output ends of said first optical fiber; filter means having first and second color portions situated adjacent the input ends of said first and second fibers; and aperture defining means interposed between said light source means and said filter means, said aperture defining means being movable relative to said filter means to vary the color of light supplied to said input ends of said first and second fibers.

4. A model according to claim 1 having a plurality of similar optical fibers extending to said base member with the input ends of said fibers terminating in a common plane, and wherein said light source means comprises a lamp; condenser means for forming an image of said lamp in a plane intermediate said condenser means and said common plane; collimating means arranged to direct said image of said lamp to said common plane; and means for at least partially obstructing said image in said intermediate plane.

5. A model according to claim 4 wherein said image obstructing means comprises means defining an aperture in said intermediate plane and means for varying the size of said aperture.

6. The model of claim 5 further including means for determining the distance between a simulated aircraft and said simulated runway, and
   wherein said means for varying the size of said aperture varies said aperture's size as a function of the determined distance.

7. A model according to claim 4 wherein said condenser means includes means defining a pupil and said collimating means forms an image of the pupil of said condenser means at said common plane.

8. A model according to claim 4 including color filter means disposed between said collimating means and said input ends of at least some of said fibers.

9. A lighted model for use with a simulator comprising, in combination:
   a base member having a first surface and a plurality of holes extending from said first surface through said base member;
   a plurality of optical fibers each having a longitudinal axis, an input end and an output end, the output end of each of said fibers extending through a respective one of said holes in said base member, each output end comprising a polished flat surface ground at an angle relative to the axis of said fiber at said output end to provide substantially total internal reflection of light and projection of light from the output end of said fiber in a predetermined direction; and
   illumination means for supplying light to the input end of each of said fibers.

10. A model according to claim 9 wherein the planes of said polished flat surfaces of said fibers are generally parallel to each other.

11. A model according to claim 9 wherein at least a portion of the first surface of said base member comprises a reduced scale version of an aircraft landing site, said output ends of said fibers represent the lights of said landing site, and said predetermined direction comprises the direction along which most light is actually projected by the lights of said landing site.

12. The model of claim 11 wherein the reduced scale version represents an airfield runway, and said predetermined direction comprises a glide slope.

13. The model of claim 12 further including means for causing some of the output ends of said fibers to simulate runway lights, others to simulate VASI lights and still others to simulate strobe lights.

14. The model of claim 9 wherein the input end of each of said fibers comprises a flat, light receiving surface generally perpendicular to the axis of the fiber at its input end, said input ends terminate in a common plane, and the longitudinal axes at said input ends are parallel; and said illumination means includes means for producing uniform illumination of said light receiving surfaces.

15. The model of claim 14 wherein said means for producing uniform illumination provides identical input cones of light to the input ends of said fibers, each input cone of light having its axis parallel to the longitudinal axes at the input ends of said fibers.

16. The model of claim 15 wherein said means for producing uniform illumination comprises:

a light source, means forming a pupil, and collimating lens means, arranged serially along an illumination axis, said illumination axis being parallel to the longitudinal axes of said fibers at their input ends, and said collimating lens means imaging said pupil on the light receiving surfaces of said fibers.

17. The model of claim 14, wherein the illumination means further includes means for varying the brightness of said illumination without altering the color or uniformity of said illumination.

18. The model of claim 17 wherein said illumination means comprises a light source, condenser means including means defining a fixed pupil, a servo controlled iris diaphragm and collimating means, arranged serially along an illumination axis, said illumination axis being parallel to the longitudinal axes at the input ends of said fibers, said condenser means imaging said light source on said iris diaphragm, and said collimating means imaging said fixed pupil on the light receiving surfaces of said fibers.

19. The model of claim 9 wherein said illumination means comprises means for varying the intensity of the light supplied to the input ends of said fibers without altering the color of said supplied light.

* * * * *